United States Patent [19]

Attarwala

[11] Patent Number: 5,306,752
[45] Date of Patent: Apr. 26, 1994

[54] CYANOACRYLATE ADHESIVES UTILIZING QUINOID COMPOUND POLYMER STABILIZER

[75] Inventor: Shabbir Attarwala, West Hartford, Conn.

[73] Assignee: Loctite Corporation, Hartford, Conn.

[21] Appl. No.: 959,323

[22] Filed: Oct. 9, 1992

[51] Int. Cl.[5] .......................... C08K 5/01; C08K 5/08; C08K 5/10; C08K 5/16
[52] U.S. Cl. ............................. 524/167; 524/186; 524/209; 524/285; 524/307; 524/308; 524/309; 524/324; 524/334; 524/356; 524/358; 524/483; 524/486; 524/555
[58] Field of Search ............... 524/209, 850, 167, 186, 524/285, 307, 308, 309, 324, 334, 356, 358, 483, 486, 555

[56] References Cited

U.S. PATENT DOCUMENTS

| | | | |
|---|---|---|---|
| 3,111,417 | 11/1963 | Strobel et al. | 524/209 |
| 3,213,550 | 11/1965 | Strobel et al. | 524/209 |
| 3,215,724 | 11/1965 | Strobel et al. | 524/209 |
| 3,336,357 | 8/1967 | Strobel et al. | 524/209 |
| 4,076,685 | 2/1978 | Kugler | 524/850 |
| 4,125,494 | 11/1978 | Schoenberg et al. | 524/850 |
| 4,297,160 | 10/1981 | Kusayama et al. | 524/850 |
| 4,532,293 | 7/1985 | Ikeda et al. | 524/754 |

*Primary Examiner*—Kriellion S. Morgan
*Attorney, Agent, or Firm*—Vidas, Arrett & Steinkraus

[57] ABSTRACT

A cyanoacrylate monomer adhesive formulation which has improved thermal properties resulting from the inclusion in the formulation of an effective amount for enhancing the thermal resistance of the cured polymer of a compound of the formula:

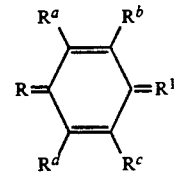

where
R is $C(CN)_2$, $C(CO_2R^e)_2$, $C(SO_2R^e)_2$ or $C(Ph)_2$; $R^a$, $R^b$, $R^c$ and $R^d$ are independently H, monovalent hydrocarbon, halogen or strong electron withdrawing groups; or two of $R^a$, $R^b$, $R^c$ and $R^d$ combined form a fused hydrocarbon ring; $R^1$ is $C(CN)_2$, $C(CO_2R^e)_2$, $C(SO_2R^e)_2$ or $C(Ph)_2$, or $R^1$ and $R^b$ combined form a fused ring having a $C(CN)_2$, $C(CO_2R^e)_2$, $C(SO_2R^e)_2$ or $C(Ph)_2$ group in conjugation with R; $R^e$ is alkyl and Ph is phenyl or R and $R^1$ are both O; and $R^a$, $R^b$, $R^c$ and $R^d$ are independently H, monovalent hydrocarbon, halogen, hydroxyl, alkoxyl or strong electron withdrawing groups, or two of $R^a$, $R^b$, $R^c$ and $R^d$ combined form a fused hydrocarbon ring, provided that at least two of $R^a$, $R^b$, $R^c$ and $R^d$ are halogen or strong electron withdrawing groups, or R is is O; $R^1$ is $C(CN)_2$, $C(CO_2R^e)_2$, $C(SO_2R^e)_2$ or a diphenylmethylene group, the phenyl groups of which may be optionally substituted with one or more halo, hydroxyl, alkoxyl, hydrocarbon, nitro, acyloxy or cyano groups; and $R^a$, $R^b$, $R^c$ and $R^d$ are independently H, monovalent hydrocarbon, halogen or strong electron withdrawing groups, or two of $R^a$, $R^b$, $R^c$ and $R^d$ combined form a fused hydrocarbon ring.

9 Claims, No Drawings

CYANOACRYLATE ADHESIVES UTILIZING QUINOID COMPOUND POLYMER STABILIZER

BACKGROUND OF THE INVENTION

Cyanoacrylate monomer adhesives are well known and widely used as "instant adhesives", so-called because of their very rapid polymerization on contact with surfaces containing even very weak anion sources. However, a notorious problem of cyanoacrylate polymers is their susceptibility to thermal degradation at only moderately high temperatures. As a consequence, the instant adhesive benefits of cyanoacrylate monomers have not been available in many applications where the bonded substrates may be subjected to intermittent temperatures in excess of 120° C. or extended exposure to temperatures of about 80° C. This problem of thermal stability of cyanoacrylate polymers is distinct from the problem of stabilizing monomer formulations against premature polymerization. However, to preserve the instant adhesive benefits of cyanoacrylates, it must be appreciated that improvements in polymer thermal stability should not significantly degrade the storage stability or cure speed of the monomer formulation from which the polymer is derived.

Numerous attempts have been made to improve the thermal stability of cyanoacrylate adhesive bonds. In U.S. Pat. No. 3,832,334, the addition of maleic anhydride is said to produce adhesives which have increased thermal resistance while preserving fast cure speed of the cyanoacrylate adhesive.

In U.S. Pat. No. 4,196,271, tri-, tetra- and higher carboxylic acids or there anhydrides are said to be useful form improving heat resistance of cured cyanoacrylate adhesives. Phthalic anhydride is reported to improve heat resistance of cyanoacrylate adhesive bonds in U.S. Pat. No. 4,450,265 and benzopheonetetracarboxylic acid or its anhydride are reported to provide a superior heat resistance for cyanoacrylate adhesives in U.S. Pat. No. 4,532,293.

According to Chem. Abst., 85:64138p a cyanoacrylate adhesive which includes a graft copolymer of methyl methacrylate and a fluorine containing rubber as a plasticizer is reported to give improved stability to thermal shocks. Cyanoacrylate adhesives containing elastomeric acrylic rubbers are reported to give improved properties, particularly after exposure to elevated temperatures, in U.S. Pat. No. 4,440,910.

In U.S. Pat. No. 4,490,515, cyanoacrylate compounds containing certain maleimide or nadimide compounds are reported to improve the hot strength properties of cyanoacrylate adhesives.

Mixtures of certain sulfone compounds and a dicarboxylic acid or dicarboxylic anhydride are said to greatly improve heat resistance of cyanoacrylate adhesives in JP 55/066980.

In JP 48/8732 cyanoacrylates containing 3-25% divinyl sulfone are reported to have improved heat resistance.

U.S. Pat. No. 4,560,723 describes certain cyanoacrylate adhesives containing a certain treated copolymer toughener, and a "sustainer" compound having certain compatibility properties said to provide improved retention of toughness on heat aging of the cured adhesive. Various substituted aryl compounds are identified as suitable "sustainers," including nitrobenzene, 1,2-dichlorobenzene, 1,2,4-trichlorobenzene and bromochlorobenzene.

Despite this extensive work in the art, there continues to be a need to identify materials which will improve the heat performance of cyanoacrylate adhesives so as to increase the options available to the formulator and/or provide further improvements over the existing additives known to enhance thermal resistance of cyanoacrylate polymers.

Various dyes are used in cyanoacrylates for coloration based on anthraquinone or similar structures. References are U.S. Pat. Nos. 3,699,076; 4,035,334; 4,062,827; 4,405,750. All of these dyes contain amino groups. It has also been known to use quinone and various phenolic compounds such as hydroquinone, t-butyl catechol, p-methoxy phenol, etc. Compounds of the quinoid structures defined below for the invention herein are not believed to have previously been reported as cyanoacrylate stable colorants or as cyanoacrylate radical stabilizers.

SUMMARY OF THE INVENTION

The invention comprises a cyanoacrylate monomer adhesive formulation which has improved thermal properties resulting from the inclusion in the formulation of an effective amount for enhancing the thermal resistance of the cured polymer of a "quinoid" compound of the formula:

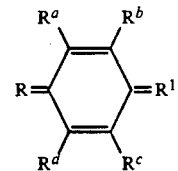

where
R is $C(CN)_2$, $C(CO_2R^e)_2$, $C(SO_2R^e)_2$ or $C(Ph)_2$; $R^a$, $R^b$, $R^c$ and $R^d$ are independently H, monovalent hydrocarbon, halogen or strong electron withdrawing groups; or two of $R^a$, $R^b$, $R^c$ and $R^d$ combined form a fused hydrocarbon ring; $R^1$ is $C(CN)_2$, $C(CO_2R^e)_2$, $C(SO_2R^e)_2$ or $C(Ph)_2$, or $R^1$ and $R^b$ combined form a fused ring having a $C(CN)_2$, $C(CO_2R^e)_2$, $C(SO_2R^e)_2$ or $C(Ph)_2$ group in conjugation with R; $R^e$ is alkyl and Ph is phenyl or R and $R^1$ are both O; and $R^a$, $R^b$, $R^c$ and $R^d$ are independently H, monovalent hydrocarbon, halogen, hydroxyl, alkoxyl or strong electron withdrawing groups, or two of $R^a$, $R^b$, $R^c$ and $R^d$ combined form a fused hydrocarbon ring, provided that at least two of $R^a$, $R^b$, $R^c$ and $R^d$ are halogen or strong electron withdrawing groups, or R is O; $R^1$ is $C(CN)_2$, $C(CO_2R^e)_2$, $C(SO_2R^e)_2$ or a diphenylmethylene group, the phenyl groups of which may be optionally substituted with one or more halo, hydroxyl, alkoxyl, hydrocarbon, nitro, acyloxy or cyano groups; and $R^a$, $R^b$, $R^c$ and $R^d$ are independently H, monovalent hydrocarbon, halogen or strong electron withdrawing groups, or two of $R^a$, $R^b$, $R^c$ and $R^d$ combined form a fused hydrocarbon ring.

As examples of electron withdrawing groups, there are carboxylate, carboxylate ester, sulfonyl, sulfonyl halide, sulfonyl ester, trihalomethyl, cyano, and nitro groups.

The quinoid compounds as defined above are suitably employed at levels of 0.1-10% by weight of the formulation. They are free of amino groups, including quarternary amino groups.

DETAILED DESCRIPTION OF THE INVENTION

The α-cyanoacrylate adhesive compositions of this invention contain as their principal ingredient one or more α-cyanoacrylate monomers of the formula:

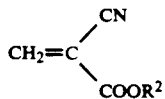

where $R^2$ represents a $C_{1-16}$ alkyl, cycloalkyl, alkenyl, alkynyl, cycloalkenyl, alkaryl, aralkyl or aryl group, any of which may be optionally substituted or, interrupted with non-basic groups, such as oxo, halo, ether oxygen and silicon, which do not interfere with the stability and functioning of the monomer as an adhesive. Specific examples of the groups for $R^2$ are a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-chlorobutyl group, a trifluoroethyl group, a 2-methoxyethyl group, a 3-methoxybutyl group and a 2-ethoxyethyl group. Ethyl cyanoacrylate is the preferred monomer for use in the inventive compositions.

A single α-cyanoacrylate monomer or a mixture of two or more of these α-cyanoacrylate monomers can be used. For a number of applications, the above α-cyanoacrylate monomer alone is not sufficient as an adhesive, and at least some of the components set forth below are typically added.

(1) An anionic polymerization inhibitor;
(2) A radical polymerization inhibitor;
(3) A thickener;
(4) Special additives such as cure accelerators, plasticizers tougheners and heat stabilizers;
(5) Perfumes, dyes, pigments, etc.

A suitable amount of the α-cyanoacrylate monomer present in the adhesive composition is about 75 to 99 by weight, based on the total weight of the adhesive composition.

An anionic polymerization inhibitor is added to the α-cyanoacrylate adhesive composition, e.g., in an amount of about 1 to 1000 ppm based on the total weight of the adhesive composition, to increase the stability of the adhesive composition during storage, and examples of known inhibitors are sulfur dioxide, sulfur trioxide, nitric oxide, hydrogen fluoride, and certain sultones. Particularly preferred for purposes of this invention are combinations of methane sulfonic acid (MSA) or hydroxypropane sulfonic acid (HPSA) with sulfur dioxide. Preferred concentrations of sulfonic acids range from about 5 to about 100, more preferably about 10 to 50, parts per million (based on monomer weight). The preferred concentrations of $SO_2$ range from about 15 to about 50 ppm for either acid.

While not essential, the cyanoacrylate adhesive compositions of this invention generally also contain an inhibitor of the free radical polymerization. The most desirable of these inhibitors are of the phenolic type, such as quinone, hydroquinone, t-butyl catechol, p-methoxyl-phenol, etc.

The above inhibitors may be used within wide ranges, but the following general guidelines are representative of the adhesive composition: acid gases, from about 0.001% to about 0.06% by weight; sulfones, from about 0.1% to about 10% by weight; sulfonic acids, from about 0.0005% to about 0.1% by weight; and free radical inhibitors, from about 0.001% to about 1%.

A thickener frequently is added to increase the viscosity of the α-cyanoacrylate adhesive composition. The α-cyanoacrylate monomer generally has a low viscosity of about several centipoises, and therefore, the adhesive penetrates into porous materials such as wood and leather or adherends having a rough surface. Thus, good adhesion strengths are difficult to obtain. Various polymers can be used as thickeners and examples include poly(methyl) methacrylate, methacrylate-type copolymers, acrylic rubbers, cellulose derivatives, polyvinyl acetate and poly(α-cyanoacrylate). A suitable amount of thickener is generally about 20% by weight or less based on the total weight of the adhesive composition, preferably 3%-10% based on the total weight of the adhesive composition.

A number of conventional polymer additives may also be added for toughening purposes. Examples include acrylic elastomers, acrylonitrile copolymer elastomers and fluoro elastomers. In appropriate amounts such materials may serve as both thickener and toughener.

Certain fumed silica fillers may also be usefully employed as cyanoacrylate thickeners. Various hydrophobic silicas are reported in the art to give satisfactory storage stable gels with cyanoacrylates. See, for instance U.S. Pat. Nos. 4,477,607, 4,533,422, 4,686,247, 4,837,260 and GB 2,204,872, all incorporated herein by reference. Preferred silicas are polydimethylsiloxane, octyltrimethoxysilane or hexamethyldisilazane treated silicas such as Cab-O-Sil® TS-720 (Cabot Corp.), Aerosil® R202 (Degussa Co.), Aerosil® R805 (Degussa Co.) or Cab-O-Sil® TS-530 (Cabot Corp.). Mixtures of such silicas may also be employed. Suitable levels of such silicas are in the range of 3%-12% based on total composition weight, preferably 4%-8%.

As examples of cure accelerators there are known, for instance, calixarene compounds as described in U.S. Pat. Nos. 4,556,700 and 4,695,615 and silacrown compounds as described in U.S. Pat. No. 4,906,317. Other accelerators are well known to those skilled in the art.

Specific examples of quinoid compounds useful in the invention include:

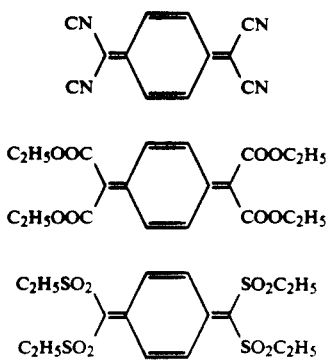

-continued

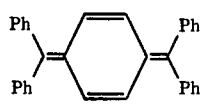
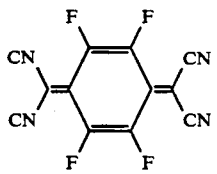
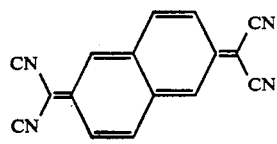
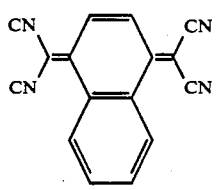
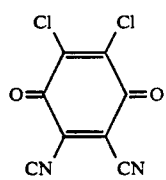
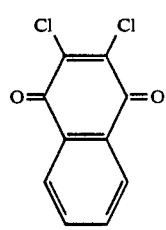
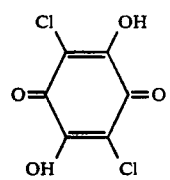
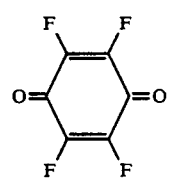
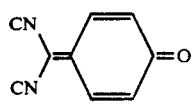

and

-continued

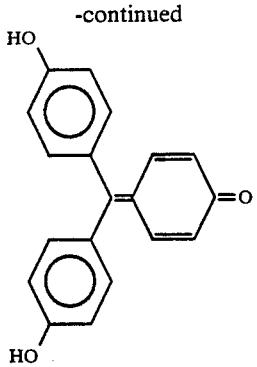

These compounds are usefully employed at levels in the range of 0.1%–10% by weight of the formulation, preferably 0.5%–5% by weight of the formulation.

The cyanoacrylate polymers of the invention which include a quinoid additive as defined above have higher thermal decomposition temperatures than compositions employing no additive. By way of contrast, polymers of the invention can be readily formulated to provide an onset of decomposition temperature when heated at 10° C. per minute of 183° C., or higher, whereas additive free polymers provide a decomposition onset temperature of only 155° C. Additionally, typical polymers of the invention are characterized by a weight loss of 25% or less, frequently 10% or less when heated at 150° C. for 900 minutes, as opposed to a 96% weight loss under identical conditions for an additive free composition.

Other additives which may be added to the cyanoacrylate adhesive compositions of the invention are plasticizers. Plasticizers serve to make the cured bonds less brittle and, therefore, more durable. The most common of these plasticizers are $C_1$ to $C_{10}$ alkyl esters of dibasic acids such as sebasic acid and malonic acid. Other plasticizers, such as diaryl ethers and polyurethanes, also may be used, and a variety of other plasticizers are also known.

The plasticizers, as well as cyanoacrylate compatible perfumes, dyes, pigments, etc., may be added depending on desired uses in amounts which do not adversely affect the stability of the α-cyanoacrylate monomer. The use of such additives is within the skill of those practicing in the cyanoacrylate adhesive art and need not be detailed herein.

EXAMPLES

The effects of various quinoid compound additives on the thermal properties of cured cyanoacrylate polymers were investigated in several ways. Thermal analyses of cyanoacrylate polymers to which had been added amounts of additive as shown in Table I were conducted dynamically to determine temperature at which decomposition onset occurred and isothermally at 150° C. to determine relative weight loss of polymer on heat aging. Fixture speeds and 82° C. stability were performed on monomer formulations containing the additives to ascertain whether the additive affected the cure speed or storage stability of the formulation.

Thermal analysis was done using two different instruments. The DuPont 2100 Thermal System with 951 Thermogravimetric Analyzer attached, and Seiko SSC5245HM2 controller attached to TG/DTA220 Thermogravimetric Differential Thermal Analyzer. Isothermal thermal runs were started from 30° C. and heated at 50° C./minute up to 150° C. and held at that temperature for 900 minutes under 250 cc/min nitrogen gas flow. Temperature dynamic runs were started at 30° C. and heated at 10° C./min up to 450° C. under 250 cc/min nitrogen gas flow.

Samples for dynamic analyses were all prepared by intimate mixing with a mortar and pestle of a prepolymerized cyanoacrylate polymer and the additive followed by heating of the mixture at 100° C. for two hours. Samples for isothermal analyses were either prepared in the same way or from a film prepared by placing a droplet of a monomer formulation containing the additive between pressed Santoprene ™ blocks for 72 hours at room temperature, postcuring at 100° C. for 2 hours to completely polymerize all residual monomer present, and then separating the resulting polymer film. Both methods of sample preparation were found to give equivalent results.

Freshly distilled ethyl cyanoacrylate monomer containing methane sulfonic acid (10 ppm), sulfur dioxide (2 ppm) and hydroquinone (3000 ppm) was used in preparing thermogravimetry analysis samples.

Fixture speeds were measured on formulations containing a polymethyl methacrylate (6 wt %), hydrophobic silica (6 wt %), calixerene (0.5 wt %) and silacrown (0.5 wt %) in ethyl cyanoacrylate monomer.

Results are summarized in Table I.

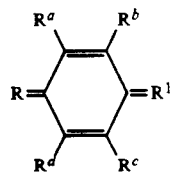

where
R is $C(CN)_2$, $C(CO_2R^e)_2$, $C(SO_2R^e)_2$ or $C(Ph)_2$; $R^a$, $R^b$, $R^c$ and $R^d$ are independently H, monovalent hydrocarbon, halogen or strong electron withdrawing groups; or two of $R^a$, $R^b$, $R^c$ and $R^d$ combined form a fused hydrocarbon ring; $R^1$ is $C(CN)_2$, $C(CO_2R^e)_2$, $C(SO_2R^e)_2$ or $C(Ph)_2$, or $R^1$ and $R^b$ combined form a fused ring having a $C(CN)_2$, $C(CO_2R^e)_2$, $C(SO_2R^e)_2$ or $C(Ph)_2$ group in conjugation with R; $R^e$ is alkyl and Ph is phenyl or R and $R^1$ are both O; and $R^a$, $R^b$, $R^c$ and $R^d$ are independently H, monovalent hydrocarbon, halogen, hydroxyl, alkoxyl or strong electron withdrawing groups, or two of $R^a$, $R^b$, $R^c$ and $R^d$ combined form a fused hydrocarbon ring, provided that at least two of $R^a$, $R^b$, $R^c$ and $R^d$ are halogen or strong electron withdrawing groups, or R is O; $R^1$ is $C(CN)_2$, $C(CO_2R^e)_2$, $C(SO_2R^e)_2$ or a

TABLE I

| Additive | % | Onset of decomposition temp (°C.) | % Wt loss at 150° C. in 900 min | 82° C. Stability (days) | Fixture speed (sec) Balsa wood | Fixture speed (sec) Cow leather |
|---|---|---|---|---|---|---|
| Invention Examples | | | | | | |
| 7,7',8,8'-Tetracyanoquinodimethane | 0.5 | 210 | 12 | 20 | 25 | 35 |
| Tetrafluorotetracyanoquinodimethane | 0.5 | 210 | 7 | 20 | 25 | 35 |
| 11,11',12,12'-Tetracyanonaptho-2,6-quinodimethane | 0.5 | 210 | 9 | 20 | 25 | 35 |
| 2,3-Dichloro-5,6-dicyano-p-benzoquinone | 0.5 | 215 | 10 | 20 | 27 | 38 |
| Tetrafluorobenzoquinone | 0.5 | 210 | 8 | 20 | 28 | 38 |
| Chloranilic acid | 0.5 | 210 | 21 | 20 | 28 | 38 |
| Aurin | 0.5 | 183 | 54 | 20 | 22 | 37 |
| Comparative Example | | | | | | |
| None | — | 155 | 96 | 20 | 25 | 35 |

From Table 1 it can be seen that the onset of thermal decomposition and isothermal outgassing properties were improved with all embodiments of the invention compared to a formulation without quinoid additive, especially with embodiments of the invention where $R^1$ was $C(CN)_2$ or O.

What is claimed is:

1. In a cyanoacrylate monomer adhesive formulation the improvement wherein the formulation includes an effective amount for enhancing the thermal resistance of the cured polymer of a quinoid compound of the formula:

diphenylmethylene group, the phenyl groups of which may be optionally substituted with one or more halo, hydroxyl, alkoxyl, hydrocarbon, nitro, acyloxy or cyano groups; and $R^a$, $R^b$, $R^c$ and $R^d$ are independently H, monovalent hydrocarbon, halogen or strong electron withdrawing groups, or two of $R^a$, $R^b$, $R^c$ and $R^d$ combined form a fused hydrocarbon ring.

2. A formulation as in claim 1 wherein said compound is present at a level of 0.1–10% by weight of the formulation.

3. A formulation as in claim 2 wherein said quinoid compound is present at a level of 0.5–5% by weight.

4. A formulation as in claim 2 wherein R is $C(CN)_2$, $C(CO_2R^e)_2$, $C(SO_2R^e)_2$ or $C(Ph)_2$; $R^a$, $R^b$, $R^c$ and $R^d$ are independently H, monovalent hydrocarbon, halogen or strong electron withdrawing groups, or two of $R^a$, $R^b$, $R^c$ and $R^d$ combined form a fused hydrocarbon ring; and $R^1$ is $C(CN)_2$, $C(CO_2R^e)_2$, $C(SO_2R^3)_2$ or $C(Ph)_2$ or $R^1$ and $R^b$ combined form a fused ring having a $C(CN)_2$, $C(CO_2R^e)_2$, $C(SO_2R^e)_2$ or $C(Ph)_2$ group in conjugation with R.

5. A formulation as in claim 2 wherein R and $R^1$ are both O; and $R^a$, $R^b$, $R^c$ and $R^d$ are independently H, monovalent hydrocarbon, halogen, hydroxyl, alkoxyl or strong electron withdrawing groups, or two of $R^a$, $R^b$, $R^c$ and $R^d$ combined form a fused hydrocarbon ring, provided that at least two of $R^a$, $R^b$, $R^c$ and $R^d$ are halogen or strong electron withdrawing groups.

6. A formulation as in claim 1 wherein R is is O; $R^1$ is a $C(CN_2)_2$, $C(CO_2R^e)_2$, $C(SO_2R^e)_2$ or diphenylmethylene group, the phenyl groups of which may be optionally substituted with one or more halo, hydroxyl, alkoxyl, hydrocarbon, nitro, acyloxy or cyano groups; and $R^a$, $R^b$, $R^c$ and $R^d$ are independently H, monovalent hydrocarbon, halogen or strong electron withdrawing groups, or two of $R^a$, $R^b$, $R^c$ and $R^d$ combined form a fused hydrocarbon ring.

7. A formulation as in claim 1 wherein said strong electron withdrawing groups are selected from the group consisting of carboxylate, carboxylate ester, sulfonyl, sulfonyl halide, sulfonyl ester, trihalomethyl, cyano, and nitro groups.

8. A formulation as in claim 7 wherein at least two of said $R^a$, $R^b$, $R^c$ and $R^d$ groups are selected from the group consisting of halo, cyano and nitro groups.

9. A formulation as in claim 1 wherein said compound is selected from the group consisting of:

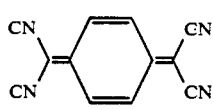

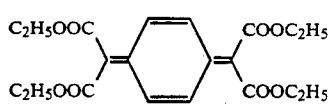

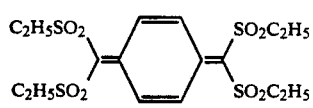

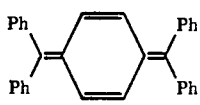

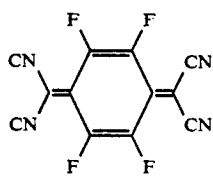

-continued

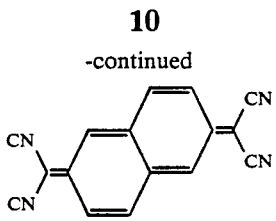

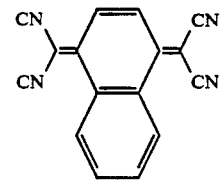

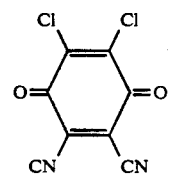

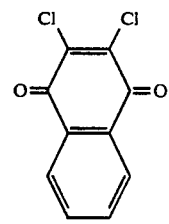

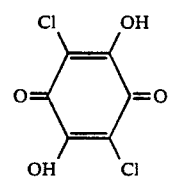

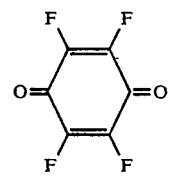

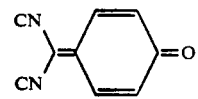

and

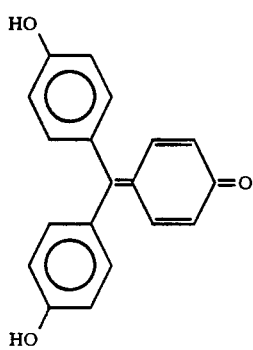

* * * * *